(12) United States Patent
Tailor et al.

(10) Patent No.: US 9,794,840 B1
(45) Date of Patent: Oct. 17, 2017

(54) SYSTEMS AND METHODS FOR DETERMINING ACCESS NODE CANDIDATES FOR HANDOVER OF WIRELESS DEVICES

(71) Applicant: Sprint Spectrum LP, Overland Park, KS (US)

(72) Inventors: Pinalkumari Tailor, Ashburn, VA (US); Yun-Sung Kim, Ashburn, VA (US); Manmeet Kaur, Ashburn, VA (US)

(73) Assignee: Sprint Sprectrum LP, Overland Park, KS (US)

( * ) Notice: Subject to any disclaimer, the term of this patent is extended or adjusted under 35 U.S.C. 154(b) by 100 days.

(21) Appl. No.: 14/287,891

(22) Filed: May 27, 2014

(51) Int. Cl.
  *H04W 4/00* (2009.01)
  *H04W 36/00* (2009.01)

(52) U.S. Cl.
  CPC .............................. *H04W 36/0083* (2013.01)

(58) Field of Classification Search
  None
  See application file for complete search history.

(56) References Cited

U.S. PATENT DOCUMENTS

| | | | |
|---|---|---|---|
| 6,434,390 B2 * | 8/2002 | Rahman | 370/332 |
| 6,671,265 B1 * | 12/2003 | Hwang | H04W 24/08 370/331 |
| 8,107,950 B2 | 1/2012 | Amirijoo et al. | |
| 8,437,752 B2 | 5/2013 | Flore et al. | |
| 2009/0264130 A1 * | 10/2009 | Catovic | H04W 36/0083 455/436 |
| 2010/0278161 A1 * | 11/2010 | Ore | H04W 36/0083 370/338 |
| 2011/0299395 A1 * | 12/2011 | Mariblanca Nieves | H04L 12/5695 370/235 |
| 2012/0106370 A1 * | 5/2012 | Radulescu | H04W 36/0083 370/252 |
| 2012/0236717 A1 * | 9/2012 | Saska | H04W 48/02 370/235 |

(Continued)

OTHER PUBLICATIONS

Ismail, et al., "Autonomous antenna tilt and power configuration based on CQI for LTE cellular networks", The Tenth International Symposium on Wireless Communications Systems 2013, pp. 405-409.

*Primary Examiner* — Kwang B Yao
*Assistant Examiner* — Juvena Loo (57) ABSTRACT

Systems and methods are described for determining candidates for handover of wireless devices in a wireless network. A first access node in communication with one or more wireless devices may receive signal information for second access nodes from the wireless devices. A communication link between the first access node and each second access node may be used to transmit second access node network characteristics to the first access node. The first access node may store information about second access nodes in a neighbor relation table. If a removal condition is satisfied, one or more second access nodes may be removed from the first access node neighbor relation table and may be blacklisted. Blacklisted second access nodes may be monitored for improvements in signal information or network characteristics. Improved second access nodes may be removed from the blacklist based on a comparison with threshold values for signal information and network characteristics.

14 Claims, 6 Drawing Sheets

(56) References Cited

U.S. PATENT DOCUMENTS

| | | | |
|---|---|---|---|
| 2012/0244903 A1 | 9/2012 | Fong et al. | |
| 2013/0130695 A1* | 5/2013 | Ryu | H04W 36/0083 455/438 |
| 2013/0244668 A1* | 9/2013 | Eckhardt | H04W 16/02 455/446 |
| 2014/0355484 A1* | 12/2014 | Foster | H04W 24/02 370/255 |

* cited by examiner

SYSTEMS AND METHODS FOR DETERMINING ACCESS NODE CANDIDATES FOR HANDOVER OF WIRELESS DEVICES

TECHNICAL BACKGROUND

Cell selection and cell re-selection are mechanisms by which wireless devices in a wireless network determine which cell will connect to each wireless device. Initially, a wireless device may detect a reference signal from a cell (i.e. access node). If the reference signal is above a threshold signal level, the wireless device may attempt to connect to this cell by a connection protocol in order to establish communication with the wireless network. Once wireless communication is established, this cell becomes the serving cell for the wireless device. If the serving cell reference signal drops below a threshold, or for other network reasons such as new cell integration, maintenance, or monitoring, the wireless device may be triggered to begin a process for cell re-selection.

Cell re-selection may include measurement by the wireless device of signal levels and network characteristics for all detected cells. The wireless device or another network node may report these measurements to the serving cell for use during the handover process. When cells should not be re-selected for handover, it is known to "blacklist" those cells in the memory of a serving cell. It may be desirable to determine and update information regarding suitable candidates for handover of wireless devices due to the signal levels and the network characteristics of these cells. It may further be desirable to continue monitoring cells included in the "blacklist" and to remove them from the "blacklist" when one or both of the signal levels and network characteristics improve above threshold values.

Overview

Systems and methods are described for determining candidate access nodes for handover of wireless devices having various classifications. A first access node may receive signal information for one or more second access nodes from a plurality of wireless devices in wireless communication with the first access node. A communication link established between the first access node and each of the second access nodes may be used to provide information and updates from the second access nodes to the first access node regarding network characteristics of each of the second access nodes. A first access node neighbor relation table (NRT) removal condition may be calculated for each of the second access nodes based on the received second access node signal information and the received second access node network characteristics. Second access nodes for which the removal condition is satisfied may be removed from the first access node NRT, and may be added to a blacklist, whereupon blacklisted second access nodes may not be added back to the first access node NRT by a protocol such as an automatic neighbor relation (ANR) process. Blacklisted second access nodes may periodically monitored for any changes in signal information or network characteristics, and second access nodes having improved signal information or network characteristics may be added back to the first access node NRT so that they may be candidates for handover of wireless devices.

DETAILED DESCRIPTION

Figure 1:
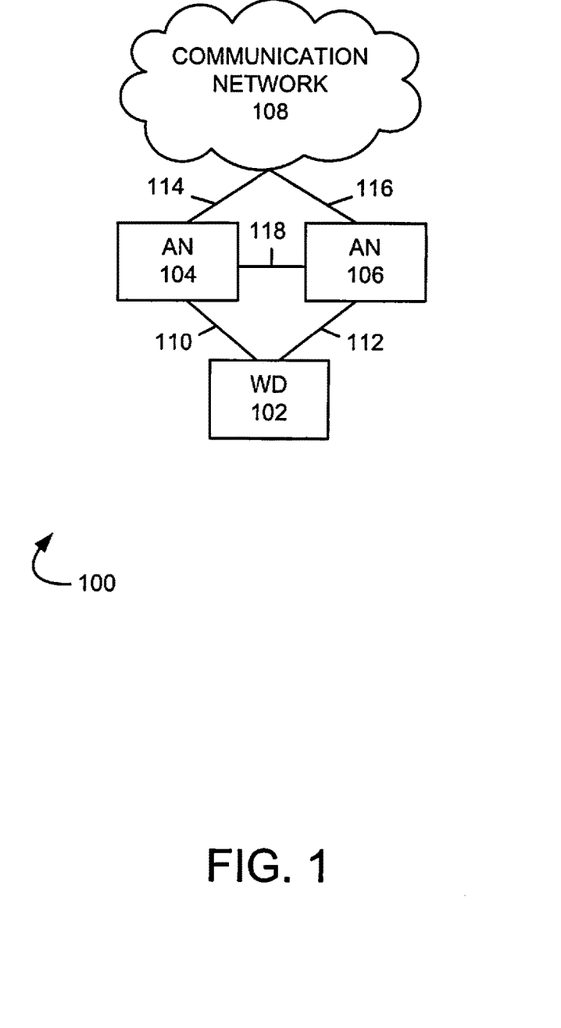
FIG. 1 illustrates an exemplary communication system to determine access node candidates for handover of wireless devices.

FIG. 1 illustrates an exemplary communication system 100 to determine an access node for a wireless device comprising wireless device 102, access nodes 104 and 106, communication network 108, and communication links 110, 112, 114, and 116. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 104, access node 106, and communication network 108 which are omitted for clarity, including additional processing nodes, routers, gateways, and physical and/or wireless data links for carrying data among the various network elements.

Wireless device 102 can be any device configured to communicate over communication system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with each of access nodes 104 and 106, any number of wireless devices can be implemented.

Access nodes 104 and 106 are network nodes capable of providing wireless communications to wireless device 102, and can be, for example, a base transceiver station, a radio base station, a NodeB device, or an eNodeB device. Access nodes 104 and 106 may communicate with communication network 108 over communication links 114 and 116. Access nodes 104 and 106 may also communicate directly with each other over communication link 118. In an embodiment, access node 104 can comprise a serving access node for wireless device 102.

Although only two access nodes 104 and 106 are illustrated in FIG. 1, wireless device 102 can be in communication with a plurality of access nodes. The plurality of access nodes can be associated with different networks and can support different communication protocols and radio access technologies.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or other types of communication equipment, as well as combinations thereof.

Communication links 110, 112, 114, 116, and 118 can be wired or wireless communication links. Wired communication links can comprise, for example, twisted pair cable, coaxial cable, or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, WiMAX, or 3GPP LTE, or combinations thereof. Other wireless protocols can also be used.

Figure 2:
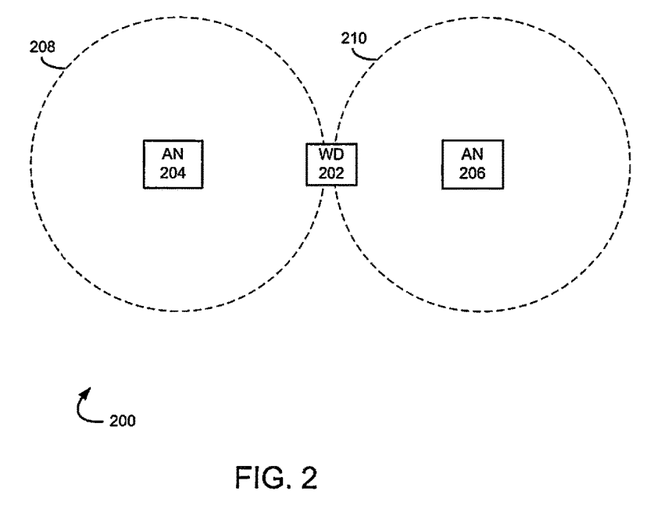
FIG. 2 illustrates another exemplary system to determine access node candidates for handover of wireless devices.

FIG. 2 illustrates an exemplary communication system 200 to determine access node candidates for handover of wireless devices. System 200 comprises at least one wireless device 202, access nodes 204 and 206, and signal radii 208 and 210. While only one wireless device is shown, it is to be understood that there will typically be more than one wireless device in communication with each access node. Wireless device 202 may comprise a device similar to wireless device 102 of FIG. 1. Similarly, access nodes 204 and 206 may comprise access nodes similar to access nodes 104 and 106 of FIG. 1.

A signal radius, or coverage radius, may comprise an area around an access node within which a wireless device can detect a signal transmitted from the access node. Signal radius 208 can comprise a radius for a reference signal, or pilot signal, transmitted from access node 204 and signal radius 210 can comprise a radius for a reference signal, or pilot signal, transmitted from access node 206.

In operation, wireless device 202 may establish communication with access node 204 such that access node 204 provides the wireless device access to a communication network (such as communication network 108, illustrated in FIG. 1). Access node 204 may transmit a reference signal, or a pilot signal, over signal radius 208 to enable wireless device 202 to detect access node 204. When wireless device 202 detects the reference signal from access node 204 and it is determined that the reference signal from access node 204 meets a threshold signal level, wireless device 202 may attempt to establish communication with access node 204. For example, the signal level may be represented by received signal strength indication (RSSI), reference signal received power (RSRP), reference signal received quality (RSRQ), signal to interference plus noise ratio (SINR), or any other suitable metric.

In an embodiment, when the reference signal from access node 204 meets a threshold signal level, wireless device 202 attempts to establish a Radio Resource Control (RRC) connection with the access node 204 by transmitting a Random Access Preamble (RAP). The access node 204 may estimate a transmission timing, which may be used to estimate a distance of the wireless device 202 from the access node 204. The access node 204 may then transmit a Random Access Response (RAR) to the wireless device 202. The RAR may include a timing advance command, which is used by the wireless device 202 to adjust a terminal transmit timing.

In an embodiment, the wireless device 202 may also transmit a wireless device application requirement of the wireless device 202 during the attempt to establish the RRC, for example, in conjunction with the RAP or in response to the RAR. The wireless device application requirement may be stored in a buffer of the access node 204 to be used while determining access node candidates for handover of wireless devices.

In an embodiment, communication system 200 may be configured to manage access node neighbor relations. For example, communication system 200 may implement a self-organizing network (SON) protocol that includes an automatic neighbor relations (ANR) process, or may implement any other suitable protocol for managing access node neighbor relations.

In an embodiment, access node 204 may not be aware of access node 206. For example, access node 204 may track neighbor access nodes using a neighbor relations table (NRT) that stores information about access node 204's neighbors. The NRT may store identifiers for neighbor access nodes, such as physical cell identifiers (PCI), cell global identifications (CGI), E-UTRAN cell identifiers (ECI), E-UTRAN cell global identifiers (ECGI), eNodeB identifiers (eNB-ID), or the like, connection information (e.g., X2 connection information), handover information, and any other relevant neighbor information. In this example, the NRT for access node 204 may not contain an entry for access node 206.

In an embodiment, access node 206 may comprise a new access node. In other words, access node 206 may have been connected to communication network 200 recently (e.g., within a threshold time period). In this example, access node 204 may not be aware of access node 206 because it is a new access node. Access node 204 may be configured to discover access node 206 using, for example, an ANR process.

In an embodiment, access node 204 may use wireless devices such as wireless device 202 in communication with access node 204 in order to discover new neighbor access nodes. For example, access node 204 may communicate with wireless device 202 in order to discover one or more neighbor access nodes such as access node 206. Here, access node 204 may transmit criteria, such as ANR criteria or criteria of another suitable protocol, to wireless devices in communication with access node 204 (e.g., wireless device 202). The ANR or other protocol criteria may comprise criteria based on relative signal information received at the wireless devices. An event may be triggered at wireless device 202 based on a comparison of the received criteria, a signal level for a reference signal or pilot signal received from access node 204, and a signal level for a reference signal or pilot signal received from access node 206.

In another embodiment, access node 204 may already be aware of access node 206. However, based on a network event such as maintenance, monitoring, or detection of reference signal levels above or below a threshold, access node 204 may trigger wireless device 202 to provide information about access node 206, such as a signal level for a reference signal of access node 206.

In response to the triggered event, wireless device 202 may transmit a measurement report to access node 204 comprising one or more signal levels for each reference signal or pilot signal received at the wireless device from access nodes such as access node 206 having signal radii that cover the area in which the wireless device is located, and at least one identifier (e.g., PCI, CGI, ECI, ECGI, eNB-ID, or the like) for each reported access node. In an embodiment, the measurement report may comprise only signal levels that are above a specified limit (e.g., a signal level threshold).

Access node 204 may receive the measurement report and compare the access node identifiers in the NRT against those in the received measurement report. If access node 204 is not aware of access node 206, the NRT for access node 204 may not include information about access node 206. Accordingly, access node 204 may begin a process to add access node 206 as a neighbor (i.e., update the NRT to include information for access node 206). In an embodiment, access node 204 may instruct wireless device 202 to retrieve an identifier for access node 206 and to transmit the access node identifier to access node 204. Using the access node identifier, access node 204 may retrieve an IP address for access node 206 (e.g., from a controller node such as an MME). A communication link may then be established between access node 204 and access node 206 (e.g., through an X2 connection). Based on this process, access node 204 may update the NRT to include identifier information about access node 206.

In an embodiment, access node 204 may request network characteristics from access nodes identified in the measurement report provided by each wireless device with which access node 204 is in communication. Access node network characteristics may comprise current and/or historical data including a utilization indicator such as physical resource block (PRB) usage, a connectivity indicator such as number of RRC connections, a capacity indicator such as average data volume per RRC connection, and handover statistics for each access node. The access node network characteristics for access node 206 and other reported neighbor access nodes may be stored and updated in the NRT or in a separate buffer, or may be transmitted to a control node such as an MME.

In an embodiment, if the utilization indicator (e.g. PRB usage) is high, but the connectivity indicator (e.g. RRC connections) and the capacity indicator are both low at a particular access node, this access node may be a candidate for future handover of wireless devices. However, if reported signal information for the particular access node is below a threshold value and there is an indication that the particular access node may have difficulty initiating and sustaining wireless connections, this particular access node may not be a desirable candidate for such handover. In an embodiment, such an access node may be removed from the first access node NRT and added to a blacklist to restrict addition to the first access node NRT by an ANR or other neighbor addition protocol, and this may help prevent handover of wireless devices to undesirable second access nodes.

In another embodiment, it may be desirable to second access nodes that from the blacklist when their signal information or network characteristics improve. For example, if the utilization indicator at a second access node decreases below a threshold value, this improved network characteristic may indicate that the second access node is now in a better condition for handover of wireless devices. In order to determine changes in access nodes such as access node 206, access node 204 may periodically monitor the signal information and network characteristics of such second access nodes and compare these values against threshold values. As exemplary embodiments, other potential signs of improvement may be signal levels above a threshold value or signal interference below a threshold value, which may be due to changes in the physical attributes of an access node caused by electrical tilt at the antenna or beam patterns. Further, if the capacity indicator increases above a threshold value, this may indicate improved throughput for each of the connected wireless devices, which may provide reason to include the access node as a candidate for handover of wireless devices. Although not specifically listed here, there may be additional indicators of improved access node connection accessibility and sustainability which may be used to remove an access node from the blacklist.

As a result of the determination of access node candidates, including the update to the NRT for access node 204 with network characteristics regarding one or more potential candidate access nodes, a handover may be performed between access node 204 and access node 206. However, handovers between access nodes may sometimes fail. The occurrence of such handover failures may be tracked in handover statistics as a handover failure rate. Such a handover failure rate may be a part of the network characteristics transmitted by access node 206, and further used to determine whether access node 206 may be a suitable candidate for access node re-selection.

Figure 3:
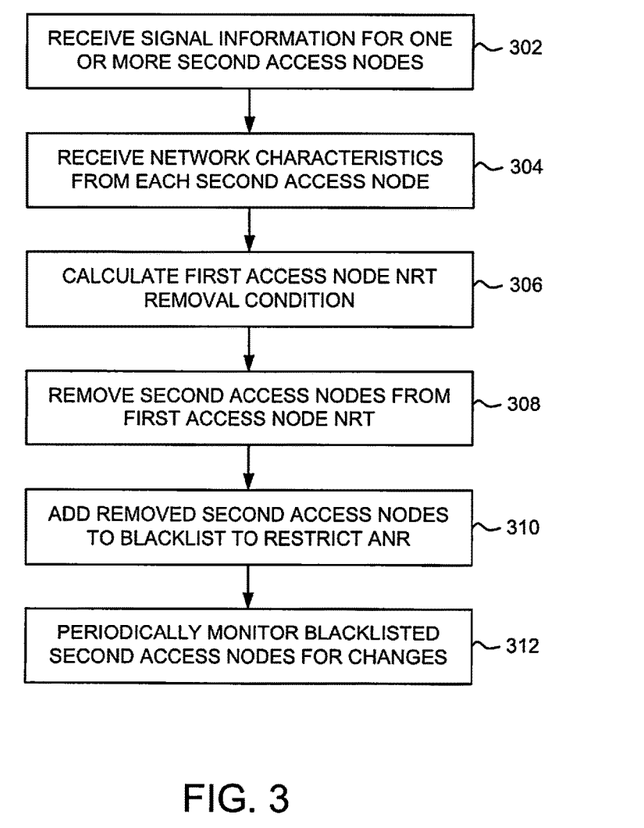
FIG. 3 illustrates an exemplary method of determining access node candidates for handover of wireless devices.

FIG. 3 illustrates an exemplary method for determining access node candidates for handover of wireless devices. The method will be discussed with reference to the exemplary communication system 200 illustrated in FIG. 2, however, the method can be implemented with any suitable communication system.

Referring to FIG. 3, at step 302, signal information for one or more of the second access nodes may be received by the first access node in response to a reporting event triggered at one or more wireless devices. The reporting event may be based on a first signal level of the first access node and a second signal level of one of more of the second access nodes. However, the reporting event may also be based on scheduled access node maintenance or monitoring, or any other relevant network event. In one exemplary embodiment, wireless device 202 may receive a reference signal or pilot signal from access node 204 at a received signal level and a reference signal or pilot signal from access node 206 at a received signal level. In an embodiment, a reporting event may be triggered at the wireless device 202 based on at least the received first signal level and the received second signal level. In response to the reporting event, wireless device 202 may transmit signal information comprising a signal level for the reference signal or pilot signal received from access node 206 and an identifier for access node 206 (e.g., PCI, CGI, ECI, ECGI, eNB-ID, or the like). Although only access nodes 204 and 206 are shown, it is to be understood that there may be a plurality of access nodes similar to access nodes 204 and 206 from which wireless device 202 may receive reference signals.

Access node 204 may comprise an NRT and it may be determined that neighbor information for access node 206 is not included in the NRT for access node 204. Alternatively, access node 204 may already be aware of access node 206, and so the NRT for access node 204 may contain an entry for access node 206. In an embodiment, an access node communication link (e.g., an X2 connection) may be established between access node 204 and access node 206. In a further embodiment, a handover of wireless device 202 may be performed from access node 204 to access node 206 based on the established communication link.

At step 304, the established communication link may be used to transmit network characteristics from each of the second access nodes to the first access node. In an embodiment, access node 204 may receive network characteristics from access node 206, which may be used to determine whether access node 206 would be a suitable candidate for handover of wireless device 202. In another embodiment, access node 204 may receive network characteristics for access node 206 from another network node, such as a controller node.

At step 306, an access node NRT removal condition may be calculated. Access node 204, or another network node, may calculate the NRT removal condition for each access node such as access node 206 based on the received signal information and the received network characteristics for each access node.

At step 308, access nodes for which the removal condition is satisfied may be removed from the NRT so that they are not selected as candidates for handover of wireless devices. Access node 204 may remove access nodes from the NRT for access node 204 when signal information and network characteristics demonstrate a degraded ability for these access nodes to establish and maintain wireless connections. Various examples of criteria that may be considered in calculating the NRT removal condition include the signal level, the signal interference, the utilization indicator, the connectivity indicator, the capacity indicator, and the handover statistics as a particular access node.

At step 310, access nodes which have been removed from the NRT may be added to a blacklist so that they are restricted from being added back to the NRT by an ANR process or other neighbor relation protocol. Access node 204 or another network node may keep track of blacklisted access nodes and report this information to wireless devices or other nodes involved in handover of wireless devices.

At step 312, blacklisted access nodes may be periodically monitored to determine whether signal information or network characteristics have changed. The period of monitoring may be a regular interval or may be triggered by a network event. Access node 204 may compare the signal information and network characteristics received during the periodic monitoring of each of the blacklisted access nodes with threshold values for each access node. For example, if the utilization indicator for an access node such as access node 206 decreases below a threshold value, this may indicate that access node 206 is a suitable candidate for handover of wireless devices. Any or all of the criteria discussed above with respect to step 308 may be considered for improvements which may indicate improved suitability for handover of wireless devices.

Figure 4:
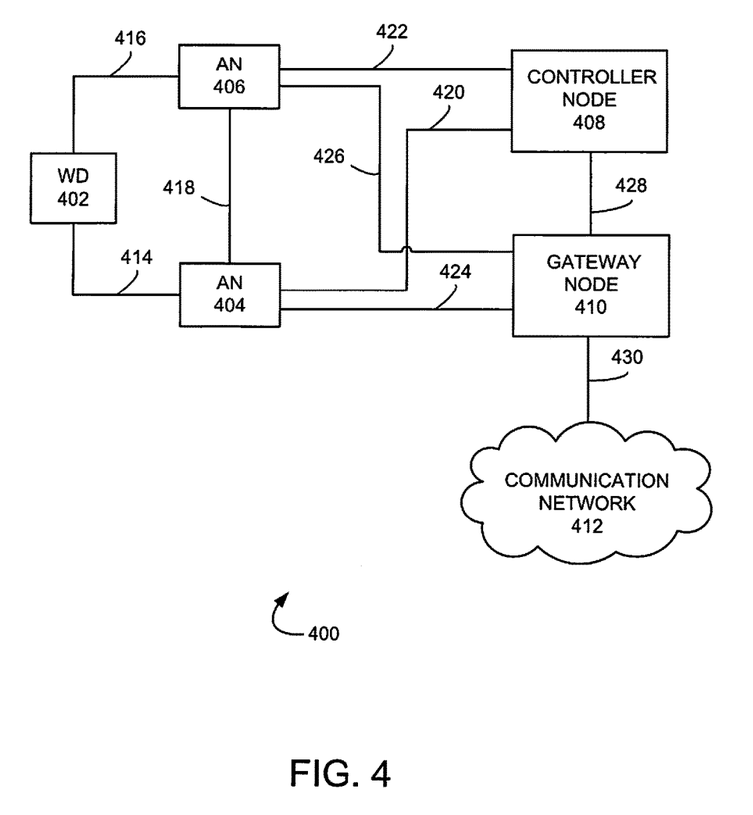
FIG. 4 illustrates another exemplary system to determine access node candidates for handover of wireless devices.

FIG. 4 illustrates another exemplary communication system 400 to determine a communication access node for a wireless device. Communication system 400 may comprise a wireless device 402, access nodes 404 and 406, controller node 408, gateway node 410, communication network 412, and communication links 414, 416, 418, 420, 422, 424, 426, 428, and 430. Other network elements may be present in the communication system 400 to facilitate communication but are omitted for clarity, such as base stations, base station controllers, gateways, mobile switching centers, dispatch application processors, and location registers such as a home location register or visitor location register.

Wireless device 402 can be any device configured to communicate over communication system 400 using a wireless communication link. For example, wireless device 402 can include a cell phone, a smart phone, a computing platform such as a laptop, palmtop, or a tablet, a personal digital assistant, or an internet access device, and combinations thereof.

Access nodes 404 and 406 are network nodes capable of providing wireless communications to wireless device 402, and can be, for example, a base transceiver station, a radio base station, a NodeB device, or an enhanced NodeB (eNodeB) device. In an embodiment, access node 404 can comprise a serving access node for wireless device 402. Access nodes 404 and 406 may communicate with controller node 408 over communication links 420 and 422, and with gateway node 410 over communication links 424 and 426. Access nodes 404 and 406 may also communicate directly with each other over communication link 418.

Controller node 408 can be any network node configured to manage services within system 400. Controller node 408 may provide other control and management functions for system 400. The controller node 408 can be a single device having various functions or a plurality of devices having differing functions. For example, controller node 408 can include at least one of a multi-cell/multicast coordination entity (MCE), a mobility management entity (MME), a radio network controller (RNC), a mobile switching center (MSC), and combinations thereof. In an embodiment, controller node 408 may perform portions of the steps illustrated in the methods of FIGS. 3 and 5.

Controller node 408 can comprise a processor and associated circuitry to execute or direct the execution of computer-readable instructions to obtain information. Controller node 408 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 408 can receive instructions and other input at a user interface. Controller node 408 can comprise a processor and associated circuitry to execute or direct the execution of computer-readable instructions to obtain information.

Gateway node 410 is a network element which can comprise a processor and associated circuitry to execute or direct the execution of computer-readable instructions. Gateway node 410 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 410 can provide instructions to access nodes 404 and 406 related to channel selection in communications with wireless device 402. For example, gateway node 410 can comprise at least one of a serving gateway (SGW), a packet data network gateway (PDNGW), a cellular gateway (CGW), and combinations thereof.

Communication network 412 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 412 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 412 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 414, 416, 418, 420, 422, 424, 426, 428, and 430 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 404 and 406, controller node 408, gateway node 410, and communication network 412 which are omitted for clarity, including additional processing nodes, routers, gateways, and physical and/or wireless data links for carrying data among the various network elements.

Figure 5:
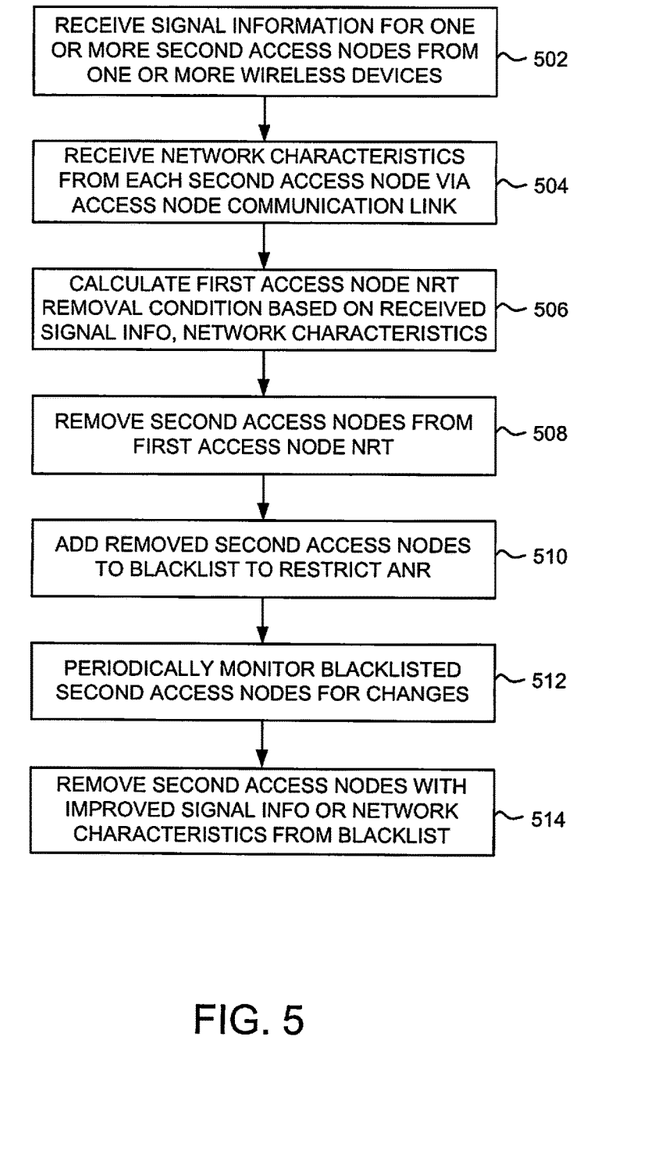
FIG. 5 illustrates another exemplary method of determining access node candidates for handover of wireless devices.

FIG. 5 illustrates an exemplary method for determining whether an access node is a candidate for handover of wireless devices. The method will be discussed with reference to the exemplary communication system 400 illustrated in FIG. 4, however, the method can be implemented with any suitable communication system.

Referring to FIG. 5, at step 502, signal information for one or more of the second access nodes may be received by the first access node in response to a reporting event triggered at one or more wireless devices. The reporting event may be based on a first signal level of the first access node and a second signal level of one or more of the second access nodes. However, the reporting event may also be based on scheduled access node maintenance or monitoring, or any other relevant network event. In one exemplary embodiment, wireless device 402 may receive a reference signal or pilot signal from access node 404 at a received signal level and a reference signal or pilot signal from access node 406 at a received signal level. In an embodiment, a reporting event may be triggered at the wireless device 402 based on at least the received first signal level and the received second signal level. In response to the triggered reporting event, wireless device 402 may transmit signal information comprising a signal level for the reference signal or pilot signal received from access node 406 and an identifier for access node 406 (e.g., PCI, CGI, ECI, ECGI, eNB-ID, or the like). Although only access nodes 404 and 406 are shown, it is to be understood that there may be additional access nodes similar to access nodes 404 and 406 from which wireless device 402 may receive reference signals.

In an embodiment, it is determined whether a communication link has been established between the first access node and each second access node based on the received identifiers. If not, the first access node establishes the communication link with each second access node for which a communication link is not already established. For example, access node 404 may comprise an NRT and it may be determined that neighbor information for access node 406 is not included in the NRT for access node 404. Accordingly, an access node communication link (e.g., an X2 connection) may be established between access node 404 and access node 406. Alternatively, access node 404 may already be aware of access node 406, and so the NRT for access node 404 may contain an entry for access node 406. In an embodiment, a handover may be performed of wireless device 402 from access node 404 to access node 406 based on the established communication link.

At step 504, the established communication link may be used to transmit network characteristics from each of the second access nodes to the first access node. In an embodiment, access node 404 may receive network characteristics from access node 406, which may be used to determine whether access node 406 would be a suitable candidate for handover of wireless device 402. Access node network characteristics may comprise current and/or historical data including a utilization indicator (e.g. PRB usage), a connectivity indicator (e.g. number of RRC connections), a capacity indicator such as average data volume per RRC connection, and handover statistics for each access node. In another embodiment, access node 404 may receive network characteristics for access node 406 from another network node, such as a controller node.

At step 506, an access node NRT removal condition may be calculated. Access node 404, or another network node, may calculate the NRT removal condition for each access node such as access node 406 based on the received signal information and the received network characteristics for each access node.

At step 508, access nodes for which the removal condition is satisfied may be removed from the NRT so that they are not selected as candidates for handover of wireless devices. Access node 404 may remove access nodes from the NRT for access node 404 when signal information and network characteristics demonstrate a degraded ability for these access nodes to establish and maintain wireless connections. Various examples of criteria that may be considered in calculating the NRT removal condition include the signal level, the signal interference, the utilization indicator, the connectivity indicator, the capacity indicator, and the handover statistics as a particular access node.

At step 510, access nodes which have been removed from the NRT may be added to a blacklist so that they are restricted from being added back to the NRT by an ANR process or other neighbor relation protocol. Access node 404 or another network node may keep track of blacklisted access nodes and report this information to wireless devices or other nodes involved in handover of wireless devices.

At step 512, blacklisted access nodes may be periodically monitored to determine whether signal information or network characteristics have changed. The period of monitoring may be a regular interval or may be triggered by a network event. Access node 404 may compare the signal information and network characteristics received during the periodic monitoring of each of the blacklisted access nodes with threshold values for each access node. For example, if the utilization indicator for an access node such as access node 406 decreases below a threshold value, this may indicate that access node 406 is a suitable candidate for handover of wireless devices. Any or all of the criteria discussed in step 508 may be considered for improvements which may indicate improved suitability for handover of wireless devices.

At step 514, access nodes with improved signal information or network characteristics may be removed from the blacklist. Access node 404 may remove access nodes that have signal information or network characteristics that indicate improved ability to initiate and sustain wireless connection. Removal of access nodes from the blacklist allows them to be added back to the NRT for access node 404, and thus to be candidates for handover of wireless devices.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 6:
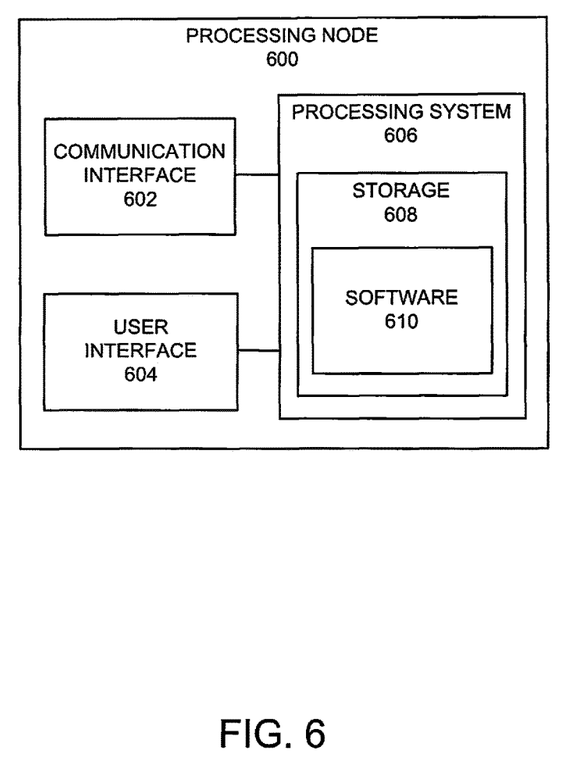
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to determine a communication access node for a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include controller node 408 and gateway node 410. Processing node 600 can also be an adjunct or component of a network element, such as an element of access nodes 104, 106, 404, or 406. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for determining access node candidates for handover of one or more wireless devices in communication with a first access node in a wireless network, the method comprising:

upon removing one or more second access nodes from a first access node neighbor relation table (NRT) based on an NRT removal condition, adding one or more of the removed second access nodes to a blacklist stored by the first access node or by a controller node in communication with the first access node, wherein blacklisted second access nodes are restricted from addition to the first access node NRT by an automatic neighbor relation (ANR) protocol;

upon detection of a reference signal from the one or more of the removed second access nodes meeting a threshold, comparing current and historical values for a signal information and network characteristics with threshold values for each of the blacklisted second access nodes, the signal information comprising a signal level or interference of each of the blacklisted second access nodes;

identifying a specific combination of network characteristics of a blacklisted second access node for removal from the blacklist, wherein the specific combination of network characteristics comprises: a utilization indicator of the blacklisted second access node being higher than a utilization threshold, a number of active radio resource connections (RRC) of the blacklisted second access node being lower than a connectivity threshold, and an average data volume per RRC connection of the blacklisted second access node being below a capacity threshold; and removing the blacklisted second access node from the blacklist.

2. The method of claim 1, further comprising calculating the NRT removal condition based on an amount of time elapsed since the first access node has received the signal information for each of the blacklisted second access nodes.

3. The method of claim 1, wherein the second access node network characteristics further comprise a handover failure rate, for each of the blacklisted second access nodes.

4. The method of claim 1, wherein the signal information for the one or more second access nodes is received from one or more of a plurality of wireless devices in wireless communication with the first access node.

5. The method of claim 1, wherein the network characteristics for each of the one or more second access nodes are received over a communication link between the first access node and each of the second access nodes.

6. The method of claim 1, wherein the utilization indicator comprises a physical resource block (PRB) usage.

7. The method of claim 3, further comprising removing one or more blacklisted second access nodes from the first access node blacklist when the received handover failure rate for each of the one or more blacklisted second access nodes decreases below a threshold handover failure rate.

8. A system for determining access node candidates for handover of wireless devices in a wireless network, the system comprising a controller node:
a first access node coupled to the controller node, configured to:
remove from a first access node neighbor relation table (NRT) one or more second access nodes for which an NRT removal condition is satisfied;
add one or more of the removed second access nodes to a blacklist stored by the first access node or by the controller node in communication with the first access node, wherein blacklisted second access nodes are restricted from addition to the first access node NRT by an automatic neighbor relation (ANR) protocol;
upon detection of a reference signal from the one or more of the removed second access nodes meeting a threshold, compare current and historical values for a signal information and network characteristics with threshold values for each of the blacklisted second access nodes, the signal information comprising a signal level or interference of each of the blacklisted second access nodes;
identify a specific combination of network characteristics of a blacklisted second access node for removal from the blacklist, wherein the specific combination of network characteristics comprises: a utilization indicator of the blacklisted second access node being higher than a utilization threshold, a number of active radio resource connections (RRC) of the blacklisted second access node being lower than a connectivity threshold, and an average data volume per RRC connection of the blacklisted second access node being below a capacity threshold; and
remove the blacklisted second access node from the blacklist.

9. The system of claim 8, wherein the first access node is further configured to calculate the NRT removal condition based on an amount of time elapsed since the first access node has received signal information for each of the second access nodes.

10. The system of claim 8, wherein the second access node network characteristics further comprise a handover failure rate, for each of the blacklisted second access nodes.

11. The system of claim 8, wherein the first access node is further configured to receive the signal information for the one or more second access nodes from one or more of a plurality of wireless devices in wireless communication with the first access node.

12. The system of claim 8, wherein the first access node is further configured to receive the network characteristics for each of the one or more second access nodes over a communication link between the first access node and each of the second access nodes.

13. The system of claim 8, wherein the utilization indicator comprises a physical resource block (PRB) usage.

14. The system of claim 10, wherein the first access node is further configured to remove one or more blacklisted second access nodes from the first access node blacklist when the received handover failure rate for each of the one or more blacklisted second access nodes decreases below a threshold handover failure rate.

* * * * *